United States Patent
Jaradi et al.

(10) Patent No.: US 12,036,940 B1
(45) Date of Patent: Jul. 16, 2024

(54) AIRBAG WITH INFLATABLE PORTION SUPPORTED BY UNINFLATABLE PORTION

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/154,911

(22) Filed: Jan. 16, 2023

(51) Int. Cl.
*B60R 21/213* (2011.01)
*B60R 21/214* (2011.01)
*B60R 21/231* (2011.01)

(52) U.S. Cl.
CPC .......... *B60R 21/213* (2013.01); *B60R 21/214* (2013.01); *B60R 2021/23107* (2013.01); *B60R 2021/23153* (2013.01); *B60R 2021/23161* (2013.01)

(58) Field of Classification Search
CPC .......... B60R 2021/23107; B60R 2021/23153; B60R 2021/23161; B60R 21/06; B60R 21/08; B60R 21/213; B60R 21/214; B60R 21/232
See application file for complete search history.

(56) References Cited

U.S. PATENT DOCUMENTS

| | | | |
|---|---|---|---|
| 7,000,944 B2 * | 2/2006 | Bakhsh | B60R 21/213 280/743.1 |
| 7,195,276 B2 | 3/2007 | Higuchi | |
| 8,403,358 B2 | 3/2013 | Choi et al. | |
| 8,851,509 B1 | 10/2014 | Choi | |
| 9,725,064 B1 | 8/2017 | Faruque et al. | |
| 9,902,362 B2 | 2/2018 | Farooq et al. | |
| 9,994,182 B1 * | 6/2018 | Jaradi | B60R 21/214 |
| 10,279,770 B2 * | 5/2019 | Faruque | B60R 21/237 |
| 10,343,642 B2 | 7/2019 | Faruque et al. | |
| 10,682,972 B2 * | 6/2020 | Faruque | B60R 21/08 |
| 10,960,844 B2 * | 3/2021 | Jimenez | B60R 21/213 |
| 11,148,630 B2 | 10/2021 | Hwangbo et al. | |
| 11,148,631 B2 * | 10/2021 | Jaradi | B60R 21/205 |
| 11,207,953 B2 * | 12/2021 | Sakurai | B60R 11/0235 |
| 11,267,431 B2 | 3/2022 | Sekizuka | |
| 11,332,094 B2 * | 5/2022 | Farooq | B60R 21/213 |
| 11,491,948 B2 * | 11/2022 | Jaradi | B60R 21/23184 |

(Continued)

FOREIGN PATENT DOCUMENTS

JP 2016088413 A 5/2016

*Primary Examiner* — Laura Freedman
(74) *Attorney, Agent, or Firm* — Frank A. MacKenzie; Bejin Bieneman PLC

(57) ABSTRACT

A vehicle includes a vehicle roof and an airbag supported by the vehicle roof. The airbag is moveable to a deployed position. The airbag includes an uninflatable portion and an inflatable portion supported by the uninflatable portion in the deployed position. The vehicle includes a first track and a second track spaced cross-vehicle from the first track. The first track and the second track are elongated downwardly from the vehicle roof. The uninflatable portion is slidably engaged with the first track and the second track. The uninflatable portion extends from the first track to the second track in the deployed position.

20 Claims, 9 Drawing Sheets

(56) References Cited

U.S. PATENT DOCUMENTS

| | | | |
|---|---|---|---|
| 11,590,921 B1* | 2/2023 | Farooq | A61G 3/0808 |
| 11,654,858 B1* | 5/2023 | Wolf | B60R 22/48 |
| | | | 280/730.1 |
| 11,673,524 B1* | 6/2023 | Faruque | B60R 21/01554 |
| | | | 280/735 |
| 11,702,026 B2* | 7/2023 | Jaradi | B60R 21/231 |
| | | | 280/753 |
| 11,702,029 B1* | 7/2023 | Golman | B60R 21/2338 |
| | | | 280/743.2 |
| 11,840,190 B1* | 12/2023 | Swiniarski | B60R 21/232 |
| 2009/0295131 A1 | 12/2009 | Kim | |
| 2016/0031401 A1 | 2/2016 | Jaradi et al. | |
| 2021/0009072 A1 | 1/2021 | Hwangbo | |
| 2022/0118933 A1* | 4/2022 | Jaradi | B60J 7/11 |
| 2023/0264645 A1* | 8/2023 | Faruque | B60R 21/232 |
| | | | 280/730.2 |

* cited by examiner

AIRBAG WITH INFLATABLE PORTION SUPPORTED BY UNINFLATABLE PORTION

BACKGROUND

Vehicles are equipped with airbags. In the event of certain vehicle impacts, an inflator activates and provides inflation medium to the airbags, and the airbags pressurize and act as supplemental restraints for occupants during the certain vehicle impacts. The airbags are located at various fixed positions in passenger compartments of vehicles. Vehicles may typically include a driver airbag mounted in the steering wheel, a passenger airbag mounted in a dashboard in a vehicle-forward direction from the front passenger seat, and side air curtains mounted in the roof rails.

DETAILED DESCRIPTION

Figure 1:
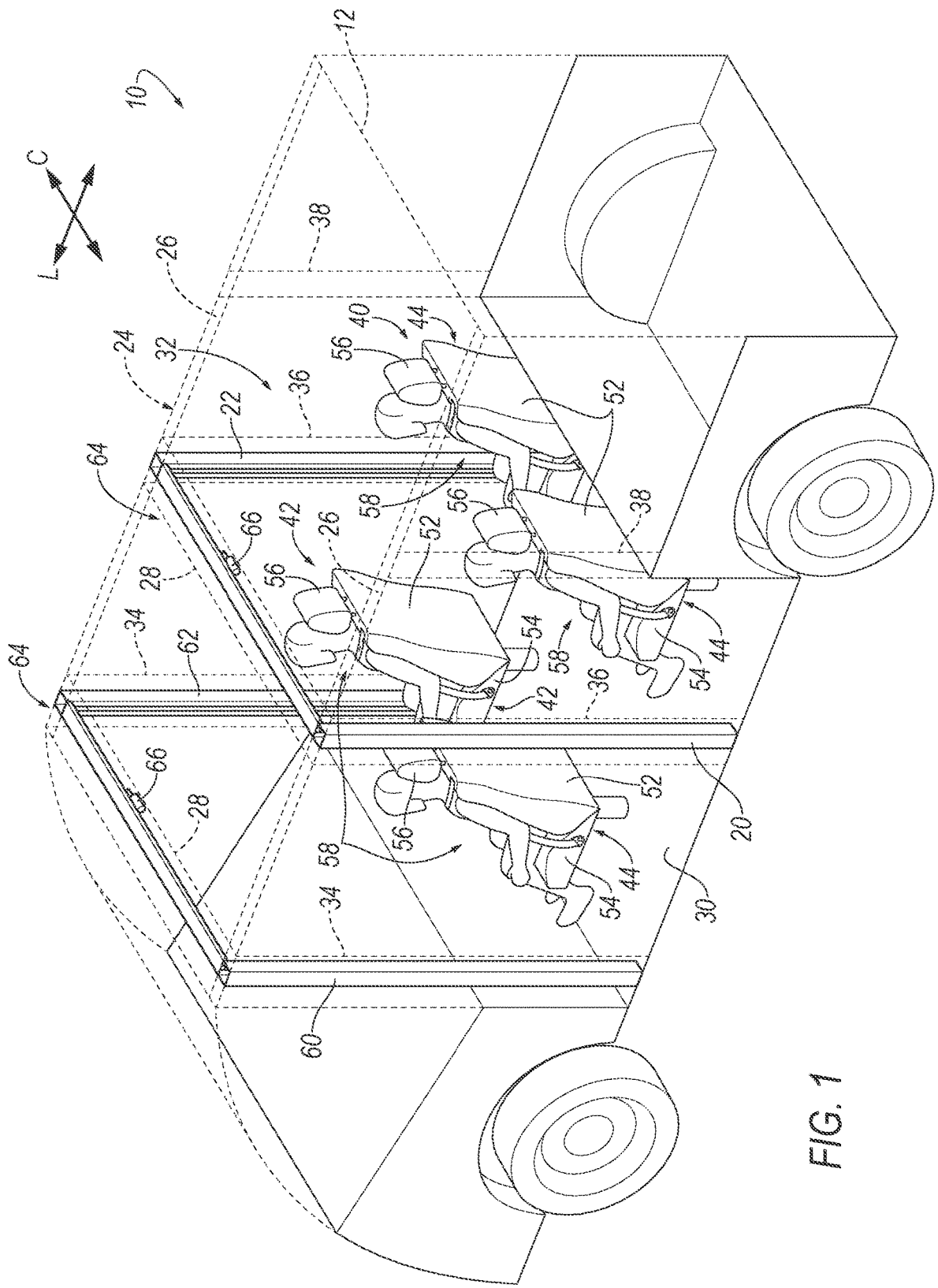
FIG. 1 is a rear perspective view of a vehicle.
Figure 2:
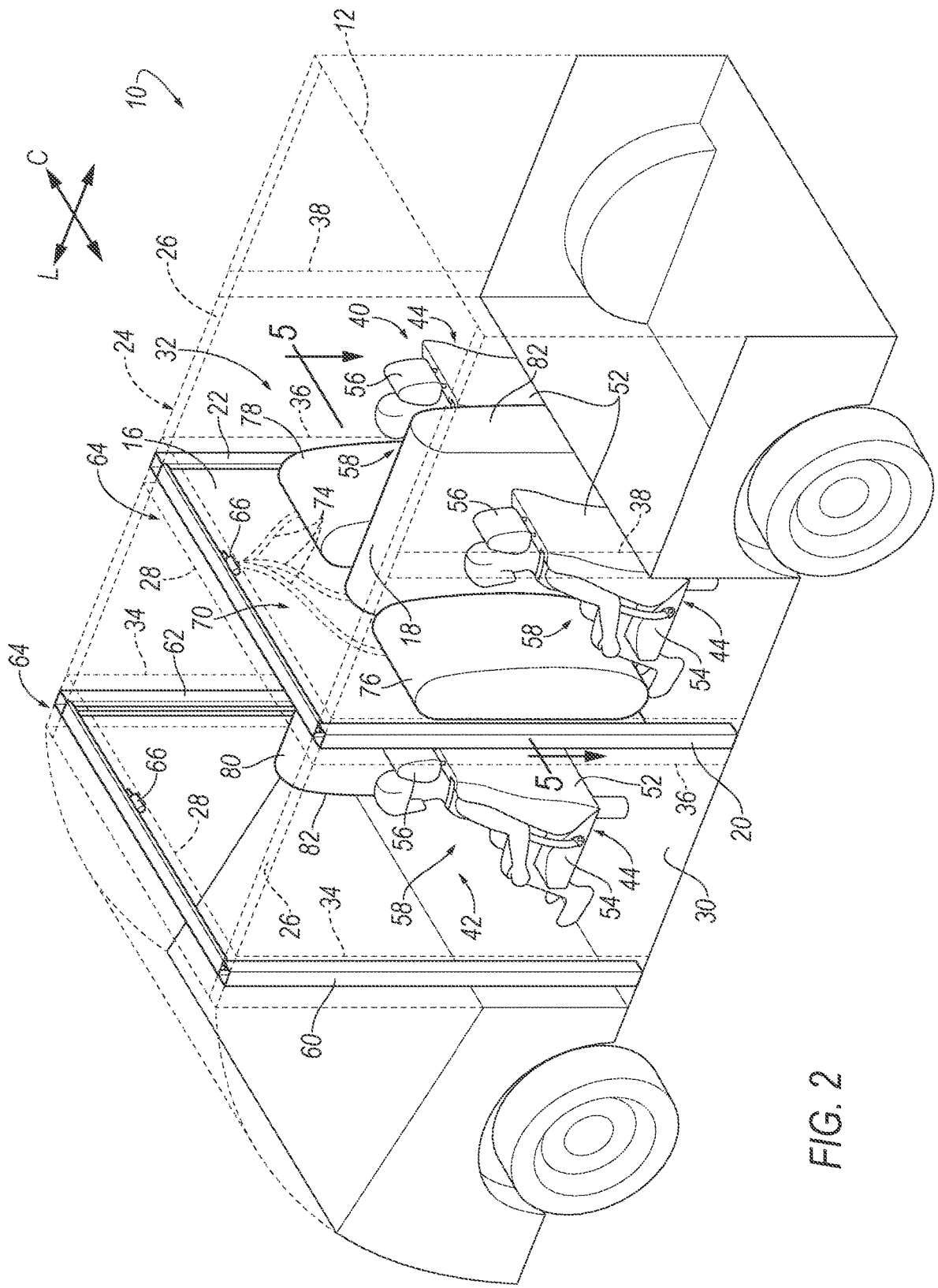
FIG. 2 is a rear perspective view of the vehicle having an airbag in an inflated position.
Figure 3:
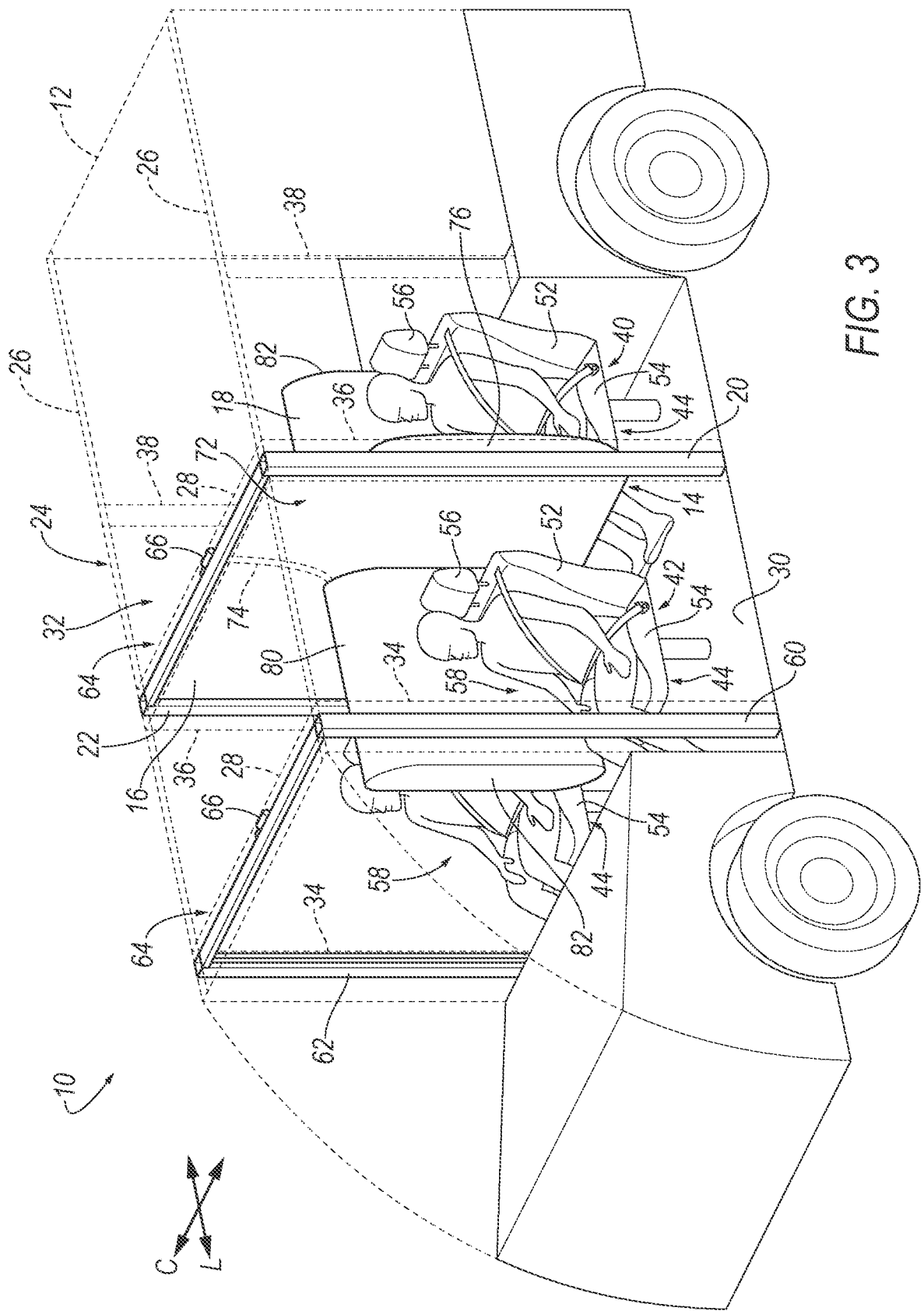
FIG. 3 is a forward perspective view of the vehicle having the airbag in the inflated position.
Figure 4:
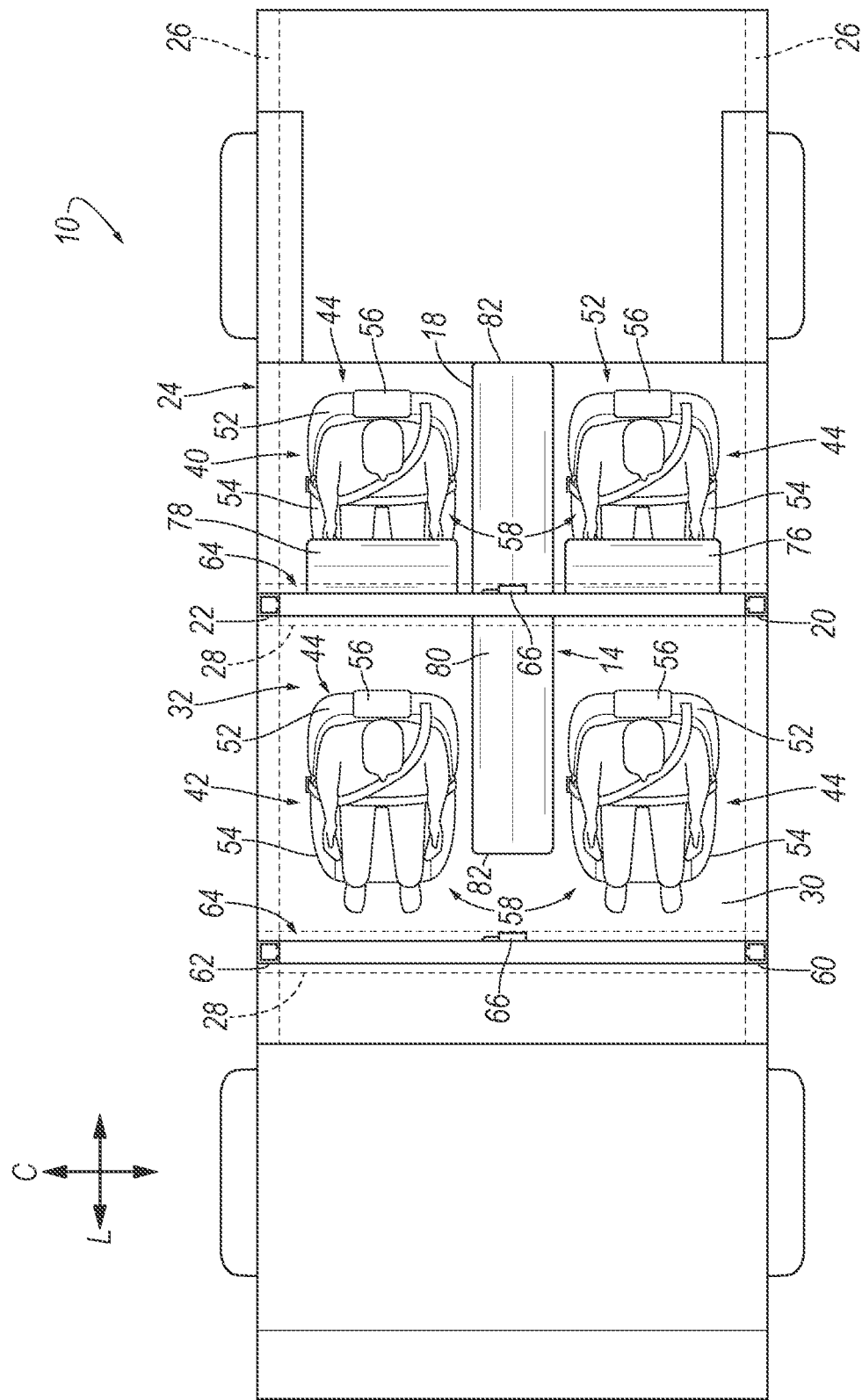
FIG. 4 is a plan view of the vehicle having the airbag in the inflated position.
Figure 5:
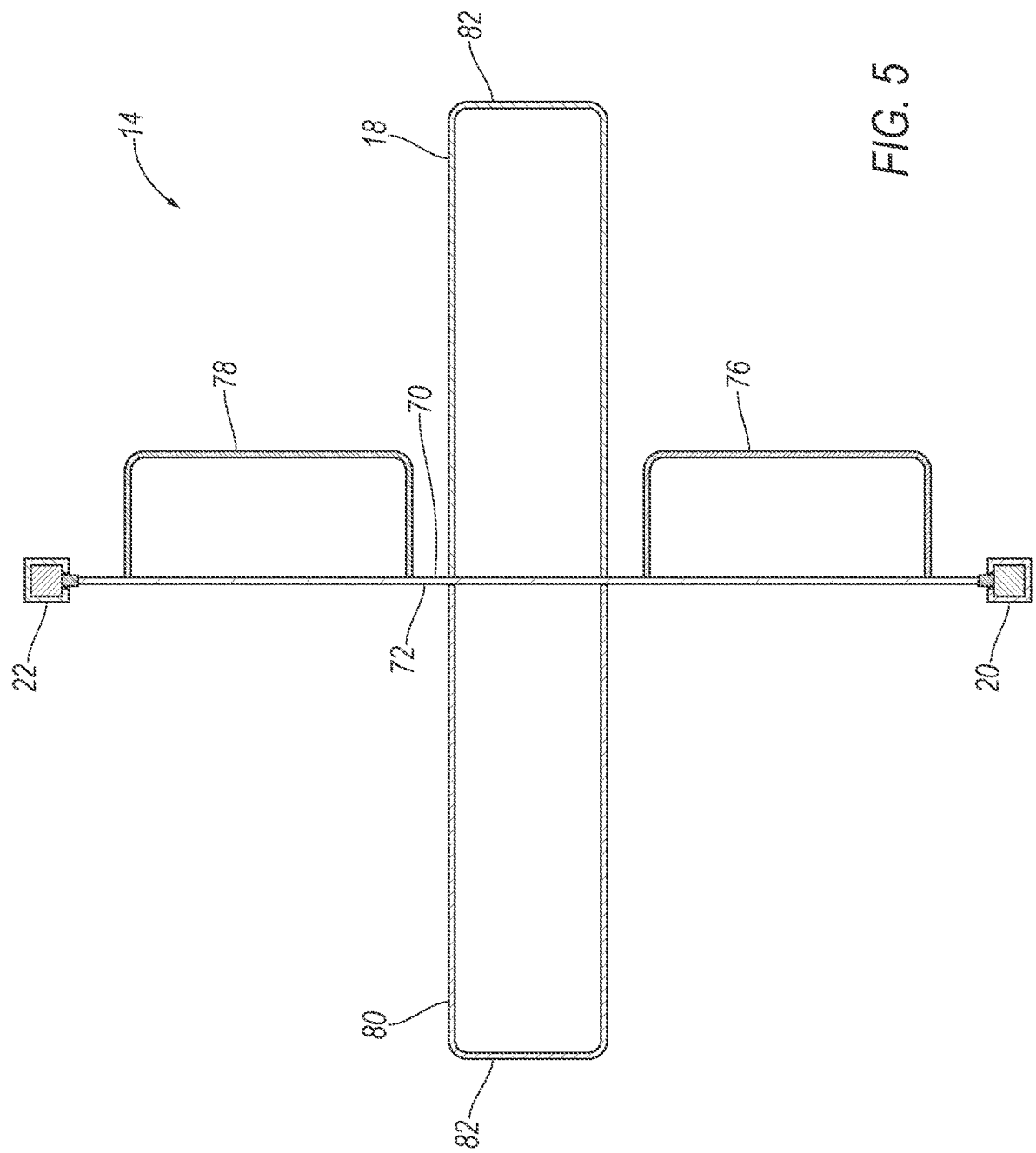
FIG. 5 is a cross-sectional view of the airbag in the inflated position through line 5 shown in FIG. 2.

A vehicle includes a vehicle roof and an airbag supported by the vehicle roof. The airbag is moveable to a deployed position. The airbag includes an uninflatable portion and an inflatable portion supported by the uninflatable portion in the deployed position. The vehicle includes a first track and a second track spaced cross-vehicle from the first track. The first track and the second track are elongated downwardly from the vehicle roof. The uninflatable portion is slidably engaged with the first track and the second track. The uninflatable portion extends from the first track to the second track in the deployed position.

The vehicle may include a first vehicle pillar and a second vehicle pillar spaced cross-vehicle from the first vehicle pillar. The first track may be supported by the first vehicle pillar and the second track may be supported by the second vehicle pillar.

The vehicle may include a second inflatable portion supported by the uninflatable portion opposite the inflatable portion. The second inflatable portion may extend vehicle-forward from the uninflatable portion and the inflatable portion extending vehicle-rearward from the inflatable position.

The vehicle may include a third inflatable portion and a fourth inflatable portion each supported by the uninflatable portion. The inflatable portion and the second inflatable portion may be between the third inflatable portion and the fourth inflatable portion.

The vehicle may include a first pair of seats and a second pair of seats spaced vehicle-forward from the first pair of seats. The inflatable portion, the second inflatable portion, the third inflatable portion, and the fourth inflatable portion may be inflatable to inflated positions and the inflatable portion may be between the first pair of seats. The second inflatable portion may be between the second pair of seats. The third inflatable portion and fourth inflatable portion may be between the first pair of seats and the second pair of seats.

The uninflatable portion may be between the first pair of seats and the second pair of seats.

The uninflatable portion may be between the second inflatable portion and the third inflatable portion and the fourth inflatable portion.

The uninflatable portion may extend from the first track to the third inflatable portion, from the third inflatable portion to the inflatable portion, from the inflatable portion to the fourth inflatable portion, and from the fourth inflatable portion to the second track.

The uninflatable portion may be between the inflatable portion and the second inflatable portion.

The vehicle may include a second inflatable portion and a third inflatable portion each supported by the uninflatable portion. The inflatable portion may be between the second inflatable portion and the third inflatable portion.

The vehicle may include a pair of seats. The second inflatable portion may be between one of the seats and the uninflatable portion and the third inflatable portion may be between the other of the seats and the uninflatable portion.

The pair of seats may each define an occupant seating area. The second inflatable portion may be between one of the occupant seating areas and the uninflatable portion and the third inflatable portion may be between the other of the occupant seating areas and the uninflatable portion.

The inflatable portion may be elongated along a vehicle-longitudinal axis.

The inflatable portion may be elongated from the uninflatable portion to a distal end spaced from the uninflatable portion.

The distal end may be spaced from the uninflatable portion in a vehicle-rearward direction.

The distal end may be spaced from the uninflatable portion in a vehicle-forward direction.

The vehicle roof may include a beam extending from the first track to the second track. The airbag may be supported by the beam.

The uninflatable portion may be slidable along the first track and the second track from an undeployed position to the deployed position. The uninflatable portion may be in the deployed position when the inflatable portion is in an inflated position.

The inflatable portion may be between the first track and the second track in the inflated position.

The uninflatable portion may extend from the first track to the inflatable portion and from the inflatable portion to the second track.

With reference to the Figures, wherein like numerals indicate like parts throughout the several views, a vehicle 10 includes a vehicle roof 12 and an airbag 14 supported by the vehicle roof 12. The airbag 14 is moveable to a deployed position. The airbag 14 includes an uninflatable portion 16 and an inflatable portion 18 supported by the uninflatable portion 16 in the deployed position. The vehicle 10 includes a first track 20 and a second track 22 spaced cross-vehicle from the first track 20. The first track 20 and the second track 22 are elongated downwardly from the vehicle roof 12. The uninflatable portion 16 is slidably engaged with the first track 20 and the second track 22. The uninflatable portion 16 extends from the first track 20 to the second track 22 in the deployed position.

In the event of certain vehicle impacts, the airbag 14 moves to the deployed position, as described further below, to control the kinematics of occupants of the vehicle 10. The airbag 14, e.g., the uninflatable portion 16, slides along the first track 20 and the second track 22 to move to the deployed position. The uninflatable portion 16 extends from the first track 20 to the second track 22. The inflatable portion 18 and the uninflatable portion 16 controls the kinematics of the occupants of the vehicle 10 relative to each other and the uninflatable portion 16 may act as a reaction surface for the inflatable portion 18. The inflatable portion 18 and the uninflatable portion 16 may control the kinematics of occupants in different seating position, e.g., facing each other, facing vehicle-forward, etc. The inflatable portion 18 may control the kinematics of occupants in a rear row of seats 44.

Figure 6:
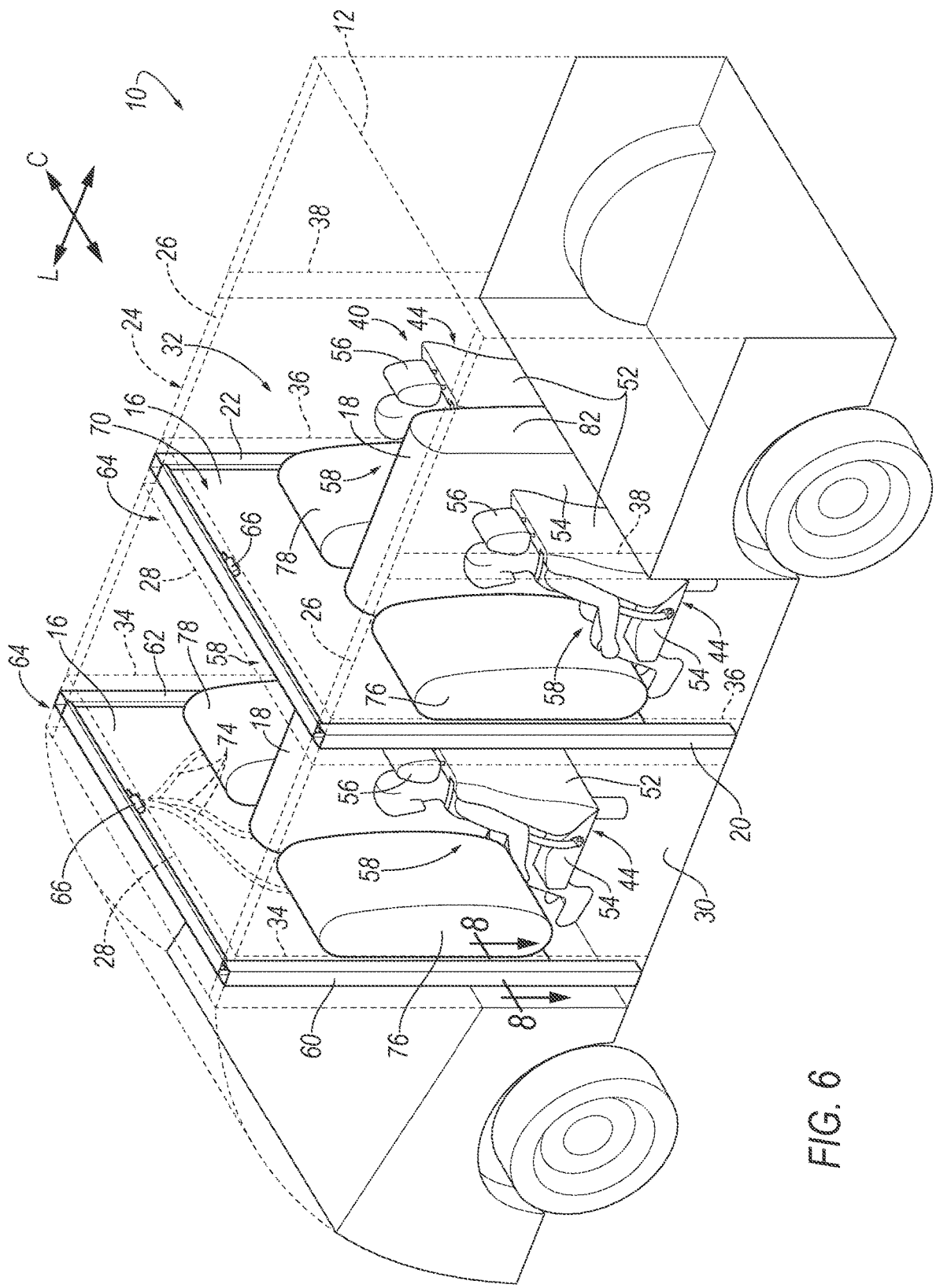
FIG. 6 is a rear perspective view of the vehicle having a second airbag in an inflated position.
Figure 7:
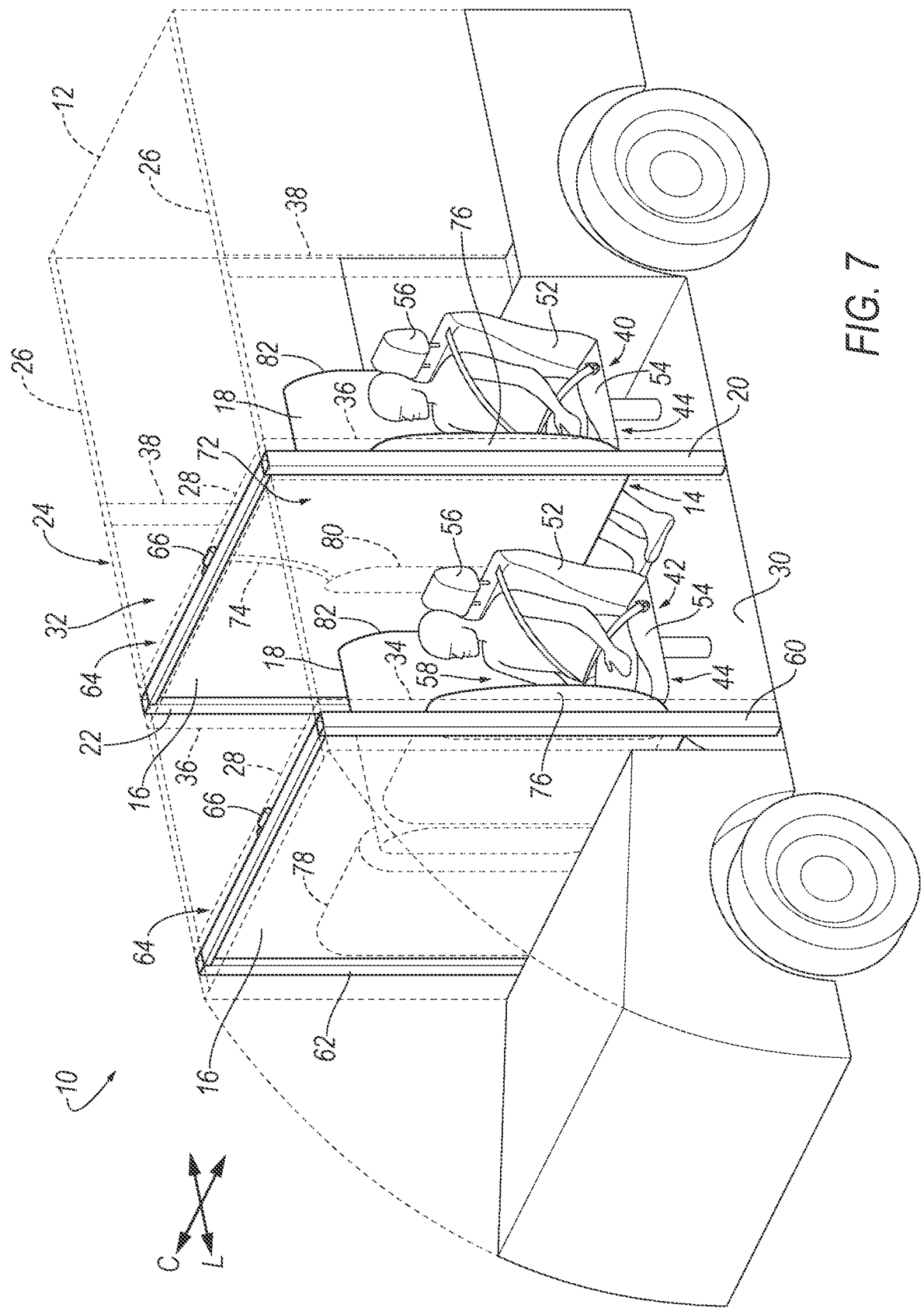
FIG. 7 is a forward perspective view of the vehicle having the second airbag in the inflated position.
Figure 8:
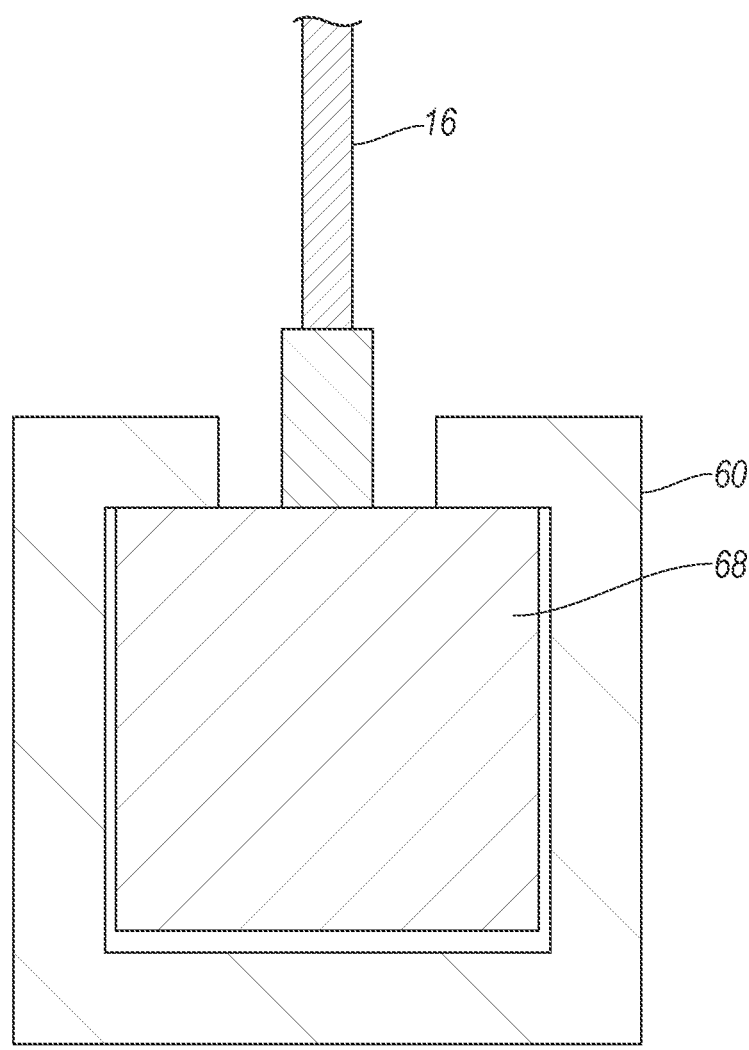
FIG. 8 is a cross-sectional view through a slider of the airbag through line 8 shown in FIG. 6.

One example of an airbag assembly 64 is shown in FIGS. 2-5 and another example of the airbag assembly 64 is shown in FIGS. 6 and 7. The example shown in FIGS. 2-5 includes four inflatable portions 18, 76, 78, 80 as further described below. Specifically, the example shown in FIGS. 2-5 includes an inflatable portion 18, 80 between two pairs 40, 42 of seats 44, one pair 42 vehicle-forward of the other pair 40 of seats 44, and the airbag assembly 64 is supported at middle pillars 36 of the vehicle 10. The example shown in FIGS. 6 and 7 includes three inflatable portions 18, 76, 78 as further described below. Specifically, the example shown in FIGS. 6 and 7 includes one inflatable portion 18 between one of the first pair 40 of seats 44 and the airbag assembly 64 is supported at front pillars 34 of the vehicle 10.

With reference to FIG. 1, the vehicle 10 may be any suitable type of automobile, e.g., a passenger or commercial automobile such as a sedan, a coupe, a truck, a sport utility, a crossover, a van, a minivan, a taxi, a bus, etc. The vehicle 10, for example, may be autonomous. In other words, the vehicle 10 may be autonomously operated such that the vehicle 10 may be driven without constant attention from a driver, i.e., the vehicle 10 may be self-driving without human input.

As described further below, the vehicle 10 includes a vehicle body 24 including rockers (not numbered), roof rails 26, roof beams 28, vehicle pillars 34, 36, 38, body panels (not numbered), vehicle floor 30, vehicle roof 12, etc. The vehicle 10 includes a passenger compartment 32 to house occupants, if any, of the vehicle 10. The passenger compartment 32 may extend across the vehicle 10, i.e., from one side to the other side of the vehicle 10. The passenger compartment 32 includes a front end and a rear end with the front end being in front of the rear end during forward movement of the vehicle 10.

The vehicle body 24, specifically, the vehicle roof 12, includes at least two roof rails 26. The roof rails 26 are cross-vehicle spaced from each other along a cross-vehicle axis C and are generally parallel to each other in a cross-vehicle direction. The roof rails 26 each extend longitudinally along the vehicle body 24, i.e., along a vehicle-longitudinal axis L of the vehicle body 24. The vehicle body 24 may include any suitable number of roof rails 26 spaced from one another and extending longitudinally along the vehicle body 24.

The vehicle body 24, specifically, the vehicle roof 12, includes at least one roof beam. The roof beam extends from one roof rail 26 to the other roof rail 26. The roof beam is irremovably fixed to both roof rails 26. In other words, the roof beam is secured to the roof rails 26 in such a way that removal requires destruction such as cutting, e.g., cutting material and/or welded joints, etc. As an example, the roof beam may be attached to both roof rails 26, e.g., by welding, fasteners, etc. In addition to the at least one roof beam, the vehicle body 24 may include any suitable number of roof beams 28 spaced from one another and extending from one roof rail 26 to the other roof rail 26.

The vehicle roof 12 and the vehicle floor 30 are spaced from each other. Specifically, the vehicle floor 30 is spaced downwardly from the vehicle roof 12. The vehicle roof 12 defines the upper boundary of the passenger compartment 32 and may extend from the front end of the passenger compartment 32 to the rear end of the passenger compartment 32. The vehicle roof 12 may include a roof panel (not numbered) extending from one roof rail 26 to the other roof rail 26. The roof panel may be irremovably fixed to the roof rails 26. In other words, the roof panel is secured to the roof rails 26 in such a way that removal requires destruction such as cutting, e.g., cutting material and/or welded joints, etc. As an example, the roof panel may be attached to both roof rails 26, e.g., by welding, fasteners, etc.

The vehicle floor 30 defines the lower boundary of the passenger compartment 32 and may extend from the front end of the passenger compartment 32 to the rear end of the passenger compartment 32. The vehicle floor 30 may include upholstery, for example, carpet, and may have a class-A surface facing the passenger compartment 32, i.e., a surface specifically manufactured to have a high quality, finished, aesthetic appearance free of blemishes.

The vehicle body 24 may include vehicle pillars 34, 36, 38 spaced from each along the vehicle-longitudinal axis L on both sides of the vehicle body 24. Specifically, in the example shown in the Figures, the vehicle body 24 includes a front pillar 34, a middle pillar 36 spaced vehicle-rearward from the front pillar 34, and a rear pillar 38 spaced vehicle-rearward from the middle pillar 36. The vehicle 10 includes a set of vehicle pillars 34, 36, 38 on each side of the vehicle body 24. In other words, the vehicle 10 includes first set of vehicle pillars 34, 36, 38 on one side of the vehicle 10 and a second set of vehicle pillars 34, 36, 38 spaced cross-vehicle from the first set of vehicle pillars 34, 36, 38. For example, the vehicle body 24 includes a front pillar 34, a middle pillar 36, and a rear pillar 38 on each side of the vehicle 10 with the vehicle pillars 34, 36, 38 being spaced from each other along the vehicle-longitudinal axis L. In other words, the front pillar 34 may be disposed at the front end of the passenger compartment 32, the rear pillar 38 may be disposed at the rear end of the passenger compartment 32, and the middle pillar 36 between the front pillar 34 and the rear pillar 38. The vehicle pillars 34, 36, 38, on both sides of the vehicle 10, may extend from the vehicle roof 12 to the vehicle floor 30 to support the vehicle roof 12. The vehicle 10 may include other vehicle pillars 34, 36, 38 in addition to the front pillar 34, the middle pillar 36, and the rear pillar 38.

With reference to FIGS. 1-4, 6, and 7, the vehicle 10 may include one or more seats 44. Specifically, the vehicle 10 may include any suitable number of seats 44. The seats 44 are supported by the vehicle floor 30 (not numbered). The seats 44 may be arranged in any suitable arrangement in the passenger compartment 32. One or more of the seats 44 may be at the front end of the passenger compartment 32, e.g., a front row of seats 44. In other examples, one or more of the seats 44 may be behind the front end of the passenger compartment 32, e.g., at the rear end of the passenger compartment 32 as a rear row of seats 44. In the example shown in the Figures, the vehicle 10 includes a first pair 40 of seats 44 and a second pair 42 of seats 44. In the examples shown in the Figures, the first pair 40 of seats 44 is arranged as a rear row of seats 44 and the second pair 42 of seats 44 is arranged as a front row of seats 44. In such an example, the second pair 42 is spaced vehicle-forward from the first pair 40. The seats 44 may be movable relative to the vehicle floor 30 to various positions, e.g., movable fore-and-aft and/or cross-vehicle. The seats 44 may be of any suitable type, e.g., a bucket seat.

Each of the seats 44, 46, 48, 50 include a seatback 52, a seat bottom 54, and a head restraint 56. The head restraint 56 may be supported by and extends upwardly from the seatback 52. The head restraint 56 may be stationary or movable relative to the seatback 52. The seatback 52 may be supported by the seat bottom 54 and may be stationary or movable relative to the seat bottom 54. The seatback 52 may extend from an upper end to a lower end. The lower end may be connected to the seat bottom 54. The upper end of the seatback 52 may be spaced upwardly from the lower end of the seatback 52, i.e., upwardly from the seat bottom 54. The head restraint 56 may extend upwardly from the upper end of the seatback 52. The seatback 52, the seat bottom 54, and the head restraint 56 may be adjustable in multiple degrees of freedom. Specifically, the seatback 52, the seat bottom 54, and the head restraint 56 may themselves be adjustable. In other words, adjustable components within the seatback 52, the seat bottom 54, and the head restraint 56 may be adjustable relative to each other.

The seatback 52 of the seat 44 defines an occupant seating area 58 of the seat 44. The occupant seating area 58 is the area occupied by an occupant when properly seated on the seat bottom 54 and the seatback 52. The occupant seating area 58 is in a seat-forward direction of the seatback 52 and above the seat bottom 54. In the example shown in FIG. 1, the occupant seating area 58 faces the front end of the passenger compartment 32 when the seat is in the forward-facing position and the occupant seating area 58 faces the rear end of the passenger compartment 32 when the seats 44 are in the rearward-facing position.

The vehicle 10 includes one or more a pair of tracks elongated downwardly from the vehicle roof 12. For example, a first pair of tracks 20, 22 may include a first track 20 and a second track 22 and a second pair of tracks 60, 62 may include a third track 60 and a fourth track 62. The tracks are spaced cross-vehicle from each other. For example, each of the tracks is supported by a vehicle pillar 34, 36, 38 of the vehicle 10. The first track 20 may be supported by the middle pillar 36 on one side of the vehicle 10 and the second track 22 may be supported by the middle pillar 36 on the other side of the vehicle 10, i.e., spaced cross-vehicle from the first track 20. Additionally, the third track 60 may be supported by the front pillar 34 on one side of the vehicle 10 and the fourth track 62 may be supported by the front pillar 34 on the other side of the vehicle 10. The vehicle 10 may include any suitable number of pairs of tracks supported by any suitable vehicle pillar 34, 36, 38 of the vehicle 10. As described further below, the number of pairs of tracks may depend on the number of airbags 14 supported by the vehicle roof 12.

As discussed above, the vehicle roof 12 may include roof beams 28 extending from one roof rail 26 to the other roof rail 26. The roof beams 28 may be aligned with the pairs of tracks supported by the vehicle pillars 34, 36, 38. Specifically, a roof beam may extend from the first track 20 to the second track 22 and another roof beam may extend from the third track 60 to the fourth track 62.

The headliner (not shown) may be supported by the vehicle body 24, specifically, the vehicle roof 12, underneath the roof panel. The headliner may conceal the roof panel, i.e., vehicle roof 12, from view inside the vehicle 10, i.e., in the passenger compartment 32 of the vehicle 10. The headliner includes a class-A surface facing the passenger compartment 32, i.e., a surface specifically manufactured to have a high quality, finished, aesthetic appearance free of blemishes. The headliner may be, for example, a polymeric panel that spans the vehicle roof 12. As an example, the headliner may include polyurethane foam.

With reference to FIGS. 1-7, the vehicle 10 includes one or more airbag assemblies 64 supported by the vehicle roof 12. Specifically, the airbag assemblies 64 may be supported by one or more of the roof beam. The airbag assembly 64 includes the airbag 14, an inflator 66, and may include a housing (not shown). The vehicle 10 may include any suitable number of airbag assemblies 64. As one example, one airbag assembly 64 may be supported by each of the roof beams 28. For example, and as shown in the Figures, the vehicle 10 may include a first airbag assembly 64 adjacent the first track 20 and the second track 22 and a second airbag assembly 64 adjacent the third track 60 and the fourth track 62. The airbag 14 of the airbag assemblies 64 is supported by the roof beam. Specifically, the airbags 14 may be supported by the roof beams 28 aligned with the pairs of tracks supported by the vehicle pillars 34, 36, 38. As described further below, the airbag assemblies 64 are substantially similar, with the exception of the location the airbag assemblies 64 are supported by the vehicle roof 12, the tracks to which the airbag assembly 64 are aligned, and the number of inflatable portions 18, 76, 78, 80.

With reference to the example shown in FIGS. 2-5 and 8, and as discussed further below, the airbag 14 includes the uninflatable portion 16 and one or more inflatable portions 18, 76, 78, 80. The airbag 14 is movable from an undeployed position to the deployed position. Specifically, the uninflatable portion 16 is movable from the undeployed position to the deployed position. The uninflatable portion 16 is slidably engaged with the tracks. The uninflatable portion 16 may include one or more sliders 68 engaged with each of the tracks. Multiple sliders 68 may be spaced along the track to allow the uninflatable portion 16 to move along the first track 20 and the second track 22 to the deployed position. As the uninflatable portion 16 moves toward the deployed position, the slider 68 slide within the first track 20 and the second track 22 until the uninflatable portion 16 reaches the deployed position.

The inflator 66 is in fluid communication with the inflatable portions 18, 76, 78, 80 of the airbag 14. The inflatable portions 18, 76, 78, 80 are fluidly isolated from each other. In other words, inflation medium does not freely pass between the inflatable portions 18, 76, 78, 80. The inflator 66 expands the airbag 14 with inflation medium, such as a gas, to move the airbag 14 from an uninflated position to an inflated position. The inflator 66 may be supported by any suitable component. For example, the inflator 66 may be supported by the housing. The inflator 66 may be, for example, a pyrotechnic inflator that ignites a chemical reaction to generate the inflation medium, a stored gas inflator that releases e.g., by a pyrotechnic valve stored gas as the inflation medium, or a hybrid. The inflator 66 may be, for example, at least partially in the inflation chamber to deliver inflation medium directly to the inflation chamber or may be connected to the inflation chamber through fill tubes, diffusers, etc.

In the deployed position, the uninflatable portion 16 extends from one side of the vehicle 10 to the other side of the vehicle 10. The uninflatable portion 16 extends from the middle pillar 36 on one side of the vehicle 10 to the middle pillar 36 on the other side of the vehicle 10 in the deployed position. Specifically, the uninflatable portion 16 extends from the first track 20 to the second track 22 in the deployed position. The uninflatable portion 16 may extend completely across the passenger compartment 32. In other words, the uninflatable portion 16 may extend between the first pair 40 of seats 44 and the second pair 42 of seats 44. The uninflatable portion 16 may extend between the occupant seating areas 58 of the first pair 40 of seats 44 and the second pair 42 of seats 44. The uninflatable portion 16 defines a vehicle-forward side 70 that faces vehicle-forward in the vehicle 10, e.g., toward the front end of the vehicle 10, and the uninflatable portion 16 defines a vehicle-rearward side 72 that faces vehicle-rearward in the vehicle 10, e.g., toward the rear end of the vehicle 10.

The uninflatable portion 16 does not inflate by the inflator 66. The uninflatable portion 16 may be a flat panel of fabric or other suitable material such that the uninflatable portion 16 does not inflate with the remainder of the airbag 14. The uninflatable portion 16 may define pathways 74 between the inflator 66 and the inflatable portions 18, 76, 78, 80 to allow inflation medium to pass from the inflator 66 to the inflatable portions 18, 76, 78, 80.

As discussed above, the airbag 14 includes one or more inflatable portions 18, 76, 78, 80. After the uninflatable portion 16 moves to the deployed position, the inflatable portions 18, 76, 78, 80 inflate from an uninflated position to an inflated position. Specifically, the inflatable portions 18, 76, 78, 80 are in the inflated position when the uninflatable portion 16 is in the deployed position. The inflatable portions 18, 76, 78, 80 may control the kinematics of the occupants of the seats 44 of the vehicle 10 in the event of certain vehicle impacts. The inflatable portions 18, 76, 78, 80 may use the uninflatable portion 16 as a reaction surface while controlling the kinematics of the occupant in the event of certain impacts. In some instances, as described further below, the inflatable portions 18, 76, 78, 80 may be inflatable between seats 44, i.e., occupants, to control the kinematics of the occupants relative to each other in the event of certain vehicle impacts.

With continued reference to FIGS. 2-5 and 8, the airbag 14 may include the inflatable portion 18, i.e., a first inflatable portion 18, a second inflatable portion 76, a third inflatable portion 78, and a fourth inflatable portion 80. The inflatable portions 18, 76, 78, 80 are supported by the uninflatable portion 16 when the uninflatable portion 16 is in the deployed position. The inflatable portions 18, 76, 78, 80 are supported by the uninflatable portion 16 between the first track 20 and the second track 22. The inflatable portions 18, 76, 78, 80 may be supported at different locations of the uninflatable portion 16, including different sides of the uninflatable portion 16. For example, the first inflatable portion 18, second inflatable portion 76, and third inflatable portion 78 are supported on the vehicle-rearward side 72 of the uninflatable portion 16 between the first track 20 and the second track 22 and the fourth inflatable portion 80 is supported on the vehicle-forward side 70 of the uninflatable portion 16 between the first track 20 and the second track 22. In addition to the inflatable portions 18, 76, 78, 80 being on different sides of the uninflatable portion 16, the inflatable portions 18, 76, 78, 80 may be spaced from each other in the cross-vehicle direction and between the first track 20 and the second track 22, as discussed further below.

As discussed above, the first inflatable portion 18 is supported on the vehicle-rearward side 72 of the uninflatable portion 16 of the airbag 14. The first inflatable portion 18 is inflatable in a vehicle-rearward direction, e.g., toward the rear end of the passenger compartment 32, away from the uninflatable portion 16. In the inflated position, the first inflatable portion 18 is elongated along the vehicle-longitudinal axis L. The first inflatable portion 18 is elongated from the uninflatable portion 16 to a distal end 82 along the vehicle-longitudinal axis L. The distal end 82 is spaced from the uninflatable portion 16. Specifically, the distal end 82 of the first inflatable portion 18 is spaced from the uninflatable portion 16 in the vehicle-rearward direction.

The uninflatable portion 16 extends from the first track 20 to the first inflatable portion 18 and from the first inflatable portion 18 to the second track 22. In other words, at least a section of the uninflatable portion 16 is between the first track 20 and the first inflatable portion 18 and at least a section of the uninflatable portion 16 is between the first inflatable portion 18 and the second track 22. Sections of the uninflatable portion 16 may be separated by the first inflatable portion 18.

In the inflated portion, the first inflatable portion 18 is between the first pair 40 of seats 44. In other words, in the inflated position, the first inflatable portion 18 is between the first pair 40 of seats 44. The first inflatable portion 18 may control the kinematics of occupants of the first pair 40 of seats 44 relative to each other.

As described above, the second inflatable portion 76 and the third inflatable portion 78 are each supported by the uninflatable portion 16. Specifically, the second inflatable portion 76 and the third inflatable portion 78 are supported by the vehicle-rearward side 72 of the uninflatable portion 16.

The second inflatable portion 76 and the third inflatable portion 78 may be between the first pair 40 of seats 44 and the second pair 42 of seats 44. In other words, the second inflatable portion 76 may be between the front row of seats 44 and the rear row of seats 44. Since the second inflatable portion 76 and the third inflatable portion 78 are supported on the vehicle-rearward side 72 of the uninflatable portion 16, the second inflatable portion 76 and the third inflatable portion 78 faces toward the first pair 40 of seats 44, i.e., the rear row of seats 44. The second inflatable portion 76 is between one of the seats 44 of the first pair 40 of seats 44 and the uninflatable portion 16. For example, the second inflatable portion 76 is between one of the seats 44 of the first pair 40 of seats 44 and the uninflatable portion 16. The second inflatable portion 76 is between the occupant seating area 58 of one of the seats 44 of the first pair 40 of seats 44 and the uninflatable portion 16. The third inflatable portion 78 is between the other of the seats 44 of the first pair 40 of seats 44. For example, the third inflatable portion 78 is between the one of the seats 44 of the first pair 40 of seats 44 and the uninflatable portion 16. The third inflatable portion 78 is between the occupant seating area 58 of the one of the seats 44 of the first pair 40 of seats 44 and the uninflatable portion 16.

Since the second inflatable portion 76 and the third inflatable portion 78 are between the uninflatable portion 16 and the seats 44, the second inflatable portion 76 and the third inflatable portion 78 are spaced cross-vehicle from each other. Specifically, the second inflatable portion 76 and third inflatable portion 78 is spaced from each other along the uninflatable portion 16. The first inflatable portion 18 is between the second inflatable portion 76 and the third inflatable portion 78. The uninflatable portion 16 may extend from the first track 20 to the second inflatable portion 76, from the second inflatable portion 76 to the first inflatable portion 18, from the first Inflatable portion 18 to the third inflatable portion 78, and from the third inflatable portion 78 to the second track 22. In other words, at least a section of the uninflatable portion 16 is between the first track 20 and the second inflatable portion 76, between the second inflatable portion 76 and the first inflatable portion 18, between the first inflatable portion 18 and the third inflatable portion 78, and the third inflatable portion 78 and the second track 22. In other words, the first inflatable portion 18, the second inflatable portion 76, and the third inflatable portion 78 are separated by the uninflatable portion 16.

With reference to FIGS. 2-5, as discussed above, the airbag 14 supported at the middle pillars 36 includes the fourth inflatable portion 80. The fourth inflatable portion 80 is supported by the uninflatable portion 16 opposite the first inflatable portion 18. In other words, the fourth inflatable portion 80 is supported by the vehicle-forward side 70 of the uninflatable portion 16. The fourth inflatable portion 80 is inflatable in a vehicle-forward direction, e.g., toward the front end of the passenger compartment 32, away from the uninflatable portion 16. The first inflatable portion 18 extends vehicle-rearward from the uninflatable portion 16 and the fourth inflatable portion 80 extends vehicle-forward from the uninflatable portion 16. Specifically, the uninflatable portion 16 is between the first inflatable portion 18 and the fourth inflatable portion 80. The uninflatable portion 16 is between the fourth inflatable portion 80 and the second inflatable portion 76 and the third inflatable portion 78. In other words, the first inflatable portion 18, the second inflatable portion 76, and the third inflatable portion 78 are inflatable vehicle-rearward and the fourth inflatable portion 80 is inflatable vehicle-forward.

In the inflated position, the fourth inflatable portion 80 is elongated along the vehicle-longitudinal axis L. The fourth inflatable portion 80 is elongated from the uninflatable portion 16 to a second distal end 82 along the vehicle-longitudinal axis L. The second distal end 82 is spaced from the uninflatable portion 16. Specifically, the second distal end 82 of the fourth inflatable portion 80 is spaced from the uninflatable portion 16 in the vehicle-forward direction.

The uninflatable portion 16 extends from the first track 20 to the fourth inflatable portion 80 and from the fourth inflatable portion 80 to the second track 22. In other words, at least a section of the uninflatable portion 16 is between the first track 20 and the fourth inflatable portion 80 and at least a section of the uninflatable portion 16 is between the fourth inflatable portion 80 and the second track 22. Sections of the uninflatable portion 16 may be separated by the first inflatable portion 18.

In the inflated position, the fourth inflatable portion 80 is between the second pair 42 of seats 44. In other words, in the inflated position, the fourth inflatable portion 80 is between the second pair 42 of seats 44. The fourth inflatable portion 80 may control the kinematics of the occupants of the second pair 42 of seats 44 relative to each other in the inflated position.

The airbag 14, including the uninflatable portion 16 and the inflatable portions 18, 76, 78, 80, may be fabric, e.g., a woven polymer. As an example, the airbag 14 may be woven nylon yarn, for example, nylon 6, 6. Other examples of woven polymers include polyether ether ketone PEEK, polyetherketoneketone PEKK, polyester, etc. The woven polymer may include a coating, such as silicone, neoprene, urethane, etc. For example, the coating may be polyorgano siloxane.

With reference to the example shown in FIGS. 6 and 7, as stated above, the vehicle 10 may include the second airbag assembly 64 supported by a second roof beam 28. Specifically, the second airbag assembly 64 may be supported adjacent the front pillars 34 of the vehicle 10 and the third track 60 and fourth track 62. The airbag 14 of the second airbag assembly 64 may be substantially similar to the first airbag assembly 64 supported adjacent the middle pillars 36 with some exceptions. For example, because the second airbag assembly 64 is supported adjacent the front pillars 34, the airbag 14 may only include the first inflatable portion 18, the second inflatable portion 76, and the third inflatable portion 78, i.e., the airbag 14 may not include the fourth inflatable portion 80. In the deployed position and the inflated position, the airbag 14 of the second airbag assembly 64 may be between the second pair 42 of seats 44 and the front end of the vehicle 10. The uninflatable portion 16 may be between the front end of the vehicle 10 and the second pair 42 of seats 44. In such an example, the first inflatable portion 18 may be between the second pair 42 of seats 44. The second inflatable portion 76 and the third inflatable portion 78 may be between the front end of the passenger compartment 32 and the second pair 42 of seats 44.

In examples including the second airbag assembly 64, the fourth inflatable portion 80 of the other airbag assembly 64 supported adjacent the middle pillars 36 does not inflate to the inflated position during certain vehicle impacts. The fourth inflatable portion 80 remaining in the uninflated position allows the first inflatable portion 18 of the second airbag assembly 64 at the front pillars 34 to move to the inflated position without interaction between the two airbag assemblies 64. The pathway 74 leading to the fourth inflatable portion 80 may selectively inflate the fourth inflatable portion 80. In other words, when the second airbag assembly 64 inflates, the fourth inflatable portion 80 does not inflate. As discussed further below, a vehicle computer 84 may be coupled to the inflator 66 or the pathway 74 to restrict inflation medium from inflating the fourth inflatable portion 80 in the event of certain vehicle impacts.

Figure 9:
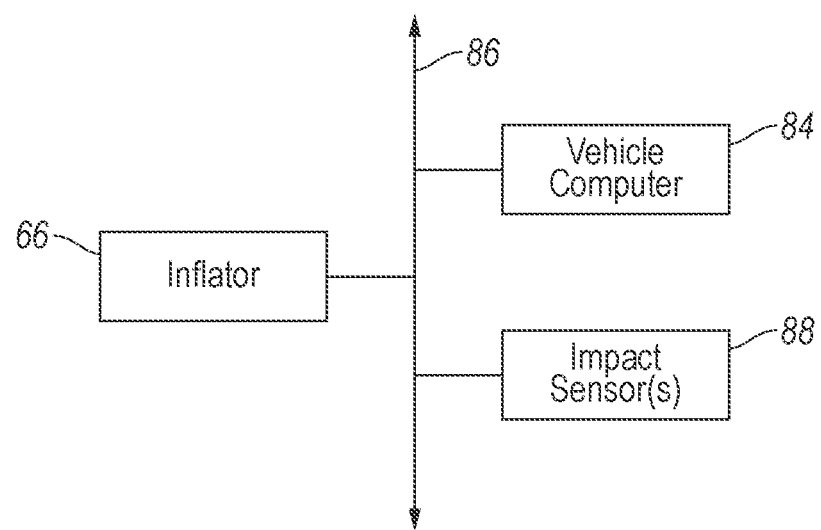
FIG. 9 is a block diagram of a vehicle communication network of the vehicle.

With reference to FIG. 9, the vehicle computer 84 includes a processor and a memory. The memory includes one or more forms of computer readable media, and stores instructions executable by the vehicle computer 84 for performing various operations, including as disclosed herein. The vehicle computer 84 may be a restraint control module. The vehicle computer 84 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the vehicle computer 84 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer.

The vehicle computer 84 is generally arranged for communications on a vehicle communication network 86 that can include a bus in the vehicle such as a controller area network CAN or the like, and/or other wired and/or wireless mechanisms. Alternatively or additionally, in cases where the vehicle computer 84 actually comprises a plurality of devices, the vehicle communication network 86 may be used for communications between devices represented as the vehicle computer 84 in this disclosure. Further, various controllers and/or sensors may provide data to the vehicle computer 84 via the vehicle communication network 86.

The vehicle 10 may include at least one impact sensor 88 for sensing certain vehicle impacts. The vehicle computer 84 may activate the inflators 66, e.g., provide an impulse to a pyrotechnic charge of the inflators 66 when the impact sensor 88 senses a certain vehicle impact. Alternatively or additionally to sensing certain vehicle impacts, the impact sensor 88 may be configured to sense certain vehicle impacts prior to impact, i.e., pre-impact sensing. The impact sensor 88 may be in communication with the vehicle computer 84. The impact sensor 88 is configured to detect certain vehicle impact. The impact sensor 88 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 88 may be located at numerous points in or on the vehicle 10.

The vehicle computer 84 may be in communication with impact sensors 88 and the inflators 66 to inflate the inflatable portions 18, 76, 78, 80. In examples where the airbag 14 of the second airbag assembly 64 inflates, the vehicle computer 84 is in communication with the inflator 66 or the pathway 74 to not inflate the fourth inflatable portion 80. In examples where the airbag 14 of the second airbag assembly does not inflate, the vehicle computer 84 is in communication with the inflator 66 or the pathway to inflate the fourth inflatable portion 80.

The vehicle 10 may include any combination of the airbag assembly 64 examples described above. For example, the vehicle 10 may include only one example described above or the vehicle 10 may include both of the examples described above. In examples including both of the examples described above, only one of the airbags 14 may inflate during certain vehicle impacts.

The disclosure has been described in an illustrative manner, and it is to be understood that the terminology which has been used is intended to be in the nature of words of description rather than of limitation. The numerical adverbs "first," "second," "third," and "fourth" are used herein merely as identifiers and do not signify order or importance. Many modifications and variations of the present disclosure are possible in light of the above teachings, and the disclosure may be practiced otherwise than as specifically described.

What is claimed is:

1. A vehicle comprising:
   a vehicle roof;
   an airbag supported by the vehicle roof and being moveable to a deployed position, the airbag including an uninflatable portion and a first inflatable portion fixed to and supported by the uninflatable portion in the deployed position;
   a first track and a second track spaced cross-vehicle from the first track, the first track and the second track being elongated downwardly from the vehicle roof;
   the uninflatable portion being slidably engaged with the first track and the second track and the uninflatable portion extending from the first track to the second track in the deployed position; and
   a second inflatable portion and a third inflatable portion each supported by the uninflatable portion, the first inflatable portion being between the second inflatable portion and the third inflatable portion.

2. The vehicle of claim 1, further comprising a first vehicle pillar and a second vehicle pillar spaced cross-vehicle from the first vehicle pillar, the first track being supported by the first vehicle pillar and the second track being supported by the second vehicle pillar.

3. The vehicle of claim 1, further comprising a fourth inflatable portion supported by the uninflatable portion opposite the first inflatable portion, the fourth inflatable portion extending vehicle-forward from the uninflatable portion and the first inflatable portion extending vehicle-rearward from the uninflatable portion.

4. The vehicle of claim 3, wherein the fourth inflatable portion is between the second inflatable portion and the third inflatable portion.

5. The vehicle of claim 4, further comprising:
   a first pair of seats and a second pair of seats spaced vehicle-forward from the first pair of seats;
   the first inflatable portion, the second inflatable portion, the third inflatable portion, and the fourth inflatable portion being inflatable to inflated positions; and
   the first inflatable portion being between the first pair of seats, the fourth inflatable portion being between the second pair of seats, and the second inflatable portion and third inflatable portion being between the first pair of seats and the second pair of seats.

6. The vehicle of claim 5, wherein the uninflatable portion is between the first pair of seats and the second pair of seats.

7. The vehicle of claim 4, wherein the uninflatable portion is between the second inflatable portion and the third inflatable portion and the fourth inflatable portion.

8. The vehicle of claim 4, wherein the uninflatable portion extends from the first track to the third inflatable portion, from the third inflatable portion to the first inflatable portion, from the first inflatable portion to the second inflatable portion, and from the second inflatable portion to the second track.

9. The vehicle of claim 3, wherein the uninflatable portion is between the first inflatable portion and the fourth inflatable portion.

10. The vehicle of claim 1, further comprising a pair of seats, the second inflatable portion being between one of the seats and the uninflatable portion and the third inflatable portion being between the other of the seats and the uninflatable portion.

11. The vehicle of claim 10, wherein the pair of seats each define an occupant seating area, the second inflatable portion being between one of the occupant seating areas and the uninflatable portion and the third inflatable portion being between the other of the occupant seating areas and the uninflatable portion.

12. The vehicle of claim 1, wherein the first inflatable portion is elongated along a vehicle-longitudinal axis.

13. The vehicle of claim 1, wherein the first inflatable portion is elongated from the uninflatable portion to a distal end spaced from the uninflatable portion.

14. The vehicle of claim 13, wherein the distal end is spaced from the uninflatable portion in a vehicle-rearward direction.

15. The vehicle of claim 13, wherein the distal end is spaced from the uninflatable portion in a vehicle-forward direction.

16. The vehicle of claim 1, wherein the vehicle roof includes a beam extending from the first track to the second track, the airbag being supported by the beam.

17. The vehicle of claim 1, wherein the uninflatable portion is slidable along the first track and the second track from an undeployed position to the deployed position, the uninflatable portion being in the deployed position when the first inflatable portion, the second inflatable portion, and the third inflatable portion are in an inflated position.

18. The vehicle of claim 1, wherein the first inflatable portion is between the first track and the second track in the deployed position.

19. The vehicle of claim 1, wherein the uninflatable portion extends from the first track to the first inflatable portion and from the first inflatable portion to the second track.

20. A vehicle comprising:
a vehicle roof;
an airbag supported by the vehicle roof and being moveable to a deployed position, the airbag including an uninflatable portion and a first inflatable portion fixed to and supported by the uninflatable portion in the deployed position;
a first track and a second track spaced cross-vehicle from the first track, the first track and the second track being elongated downwardly from the vehicle roof;
the uninflatable portion being slidably engaged with the first track and the second track and the uninflatable portion extending from the first track to the second track in the deployed position; and
a second inflatable portion supported by the uninflatable portion opposite the first inflatable portion, the second inflatable portion extending vehicle-forward from the uninflatable portion and the first inflatable portion extending vehicle-rearward from the uninflatable portion.

* * * * *